Oct. 3, 1939.    C. L. LOTHROP    2,175,085
CONTROL MECHANISM
Filed June 18, 1936    4 Sheets-Sheet 1

Fig. 1.

INVENTOR
Carlton L. Lothrop
BY
Blair, Curtis & Dunne
ATTORNEYS

Oct. 3, 1939.   C. L. LOTHROP   2,175,085
CONTROL MECHANISM
Filed June 18, 1936   4 Sheets-Sheet 4

INVENTOR
Carlton L. Lothrop
BY
Blair, Curtis & Dunne
ATTORNEYS

Patented Oct. 3, 1939

2,175,085

UNITED STATES PATENT OFFICE

2,175,085

CONTROL MECHANISM

Carlton L. Lothrop, Foxboro, Mass., assignor to The Foxboro Company, Foxboro, Mass., a corporation of Massachusetts Application June 18, 1936, Serial No. 85,911

7 Claims. (Cl. 236—91)

This invention relates to control mechanism, and more particularly to control mechanism whereby a desired relationship may be maintained between several variables.

It is an object of this invention to provide control mechanism which measures the respective values of two variable conditions, and controls one of the same in accordance with their deviation from a desired predetermined relationship, and to provide a control mechanism which will simply, efficiently, and accurately accomplish such control.

The particular embodiment by which I have chosen to illustrate my invention is a control mechanism adapted to maintain a desired relationship between two variable temperatures. An illustration of the application of a controller of this type is to the maintenance of the relationship of the outdoor temperature to the steam temperature of the heating system of a building at a constant value, in order to control the indoor temperature of the building. It has been determined that in maintaining a constant indoor temperature, all other things being equal, the steam temperature will vary in a substantially constant relationship to the variation in the outdoor temperature, and it is this relationship upon which the operation of this embodiment of my invention is based.

This method of indoor temperature control has been receiving increasing attention in recent years, due to the difficulty which always attends the control of room temperature by air thermostats. In the latter type of control, if the thermostats are suitably responsive they are too readily affected by drafts and air currents from open doors and windows, and by other similar incidental and momentary fluctuations of the air temperature. There is not only the difficulty of choosing a representative room, but also the problem of the location of the thermostat within that room. These problems at times become so acute as to render indoor temperature control by this method almost completely ineffectual. In addition, this method permits heating to be accomplished more efficiently.

It is possible, by the use of this invention, to provide a temperature controller which will maintain a desired relationship of the outdoor temperature to the steam temperature over a wide range of variation in the outdoor temperature, whereby the indoor temperature may be maintained at a substantially constant value for any given building.

It is an object of my invention to obtain this type of control by simple, accurate, and efficient apparatus, the entire power for the operation thereof being obtained from the movement of the condition measuring elements themselves, and this result being accomplished without unduly burdening these condition measuring means, in order to prevent the impairment of the accuracy of their indication.

Other objects of this invention will be in part obvious or in part pointed out hereinafter in the following description and the appended claims.

In order that a more complete understanding may be had of my invention, reference should be made to the accompanying drawings, in which:—

Corresponding parts of the various figures are referred to by the same numbers.

Figure 1:
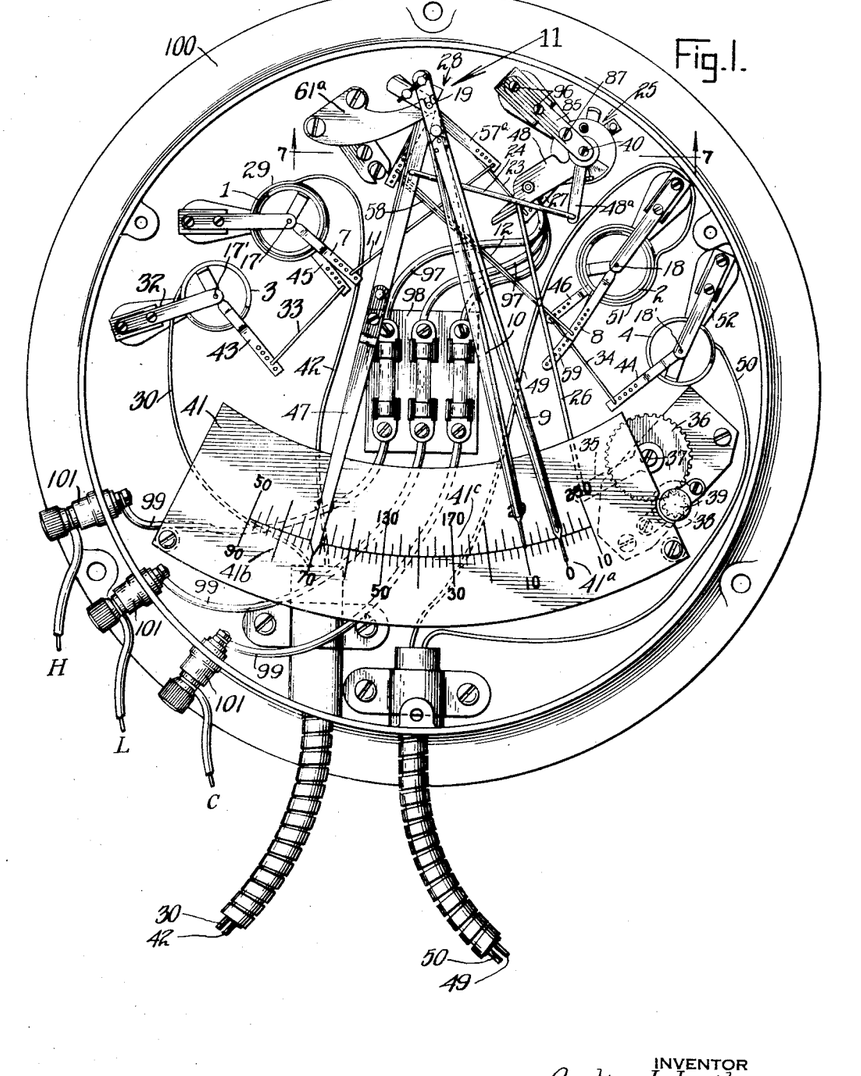
Figure 1 is a front elevation of a control instrument illustrating one embodiment of my invention, shown with the cover removed in order to illustrate the arrangement of the parts.
Figures 4, 5, 6A, 6B:
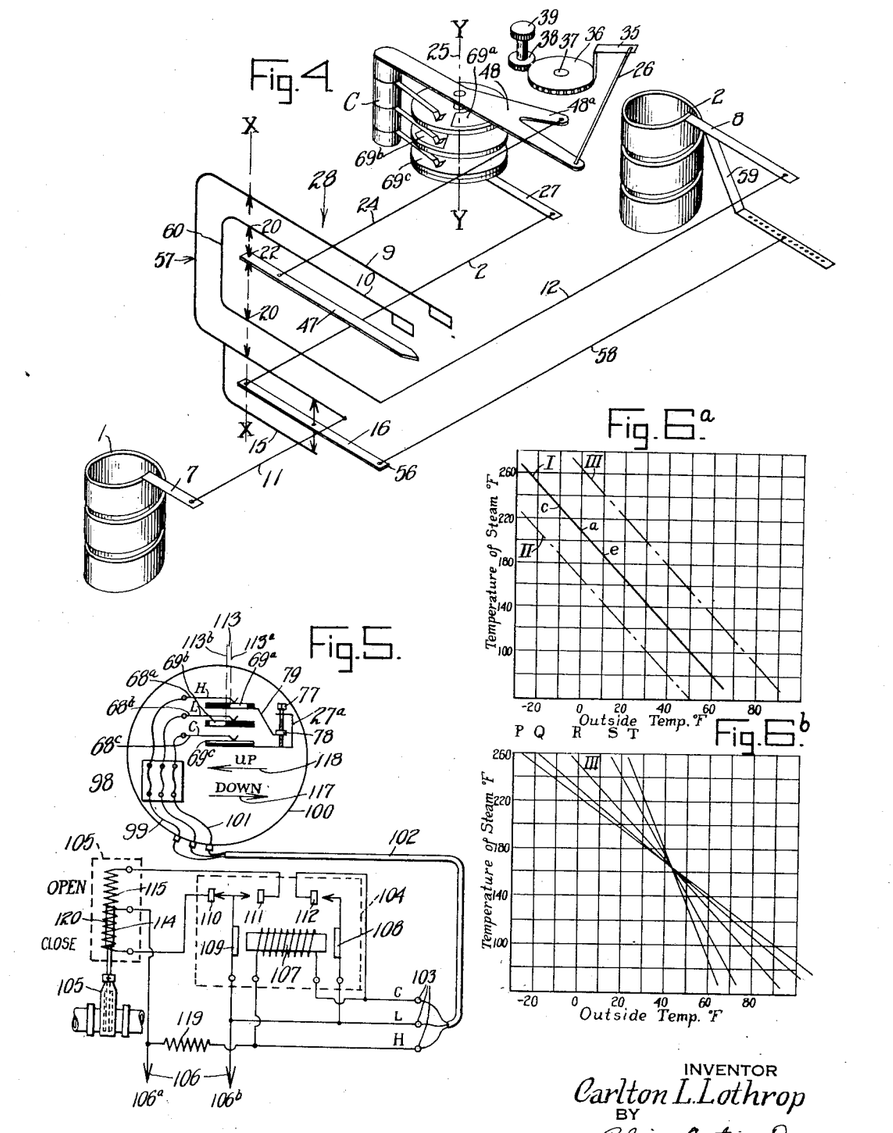
Figure 4 is a schematic diagram in perspective showing the lever mechanism used to permit the various indicating arms to be pivotally mounted along a common axis of rotation.
Figure 5 is a schematic wiring diagram of an electrical control circuit which may be used with this controller.
Figures 6a and 6b show two graphs illustrating the type of control which may be obtained with this embodiment.
Figure 7:
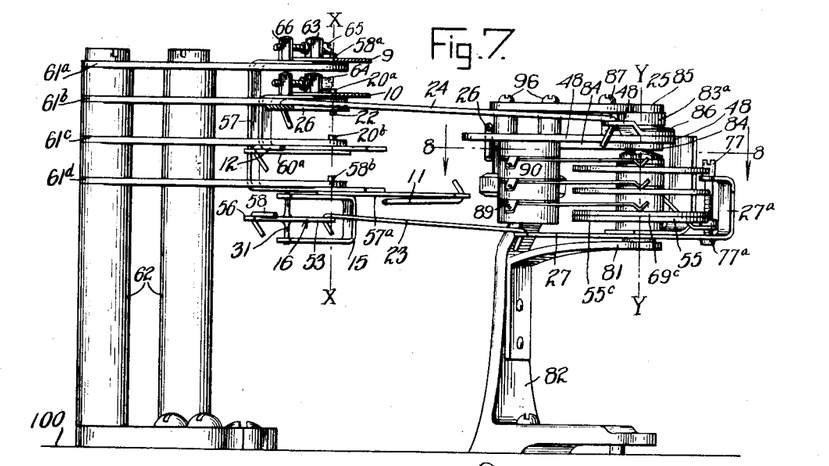
Figure 7 is a front elevation of the pivoting mounting and switch mechanism taken on section 7—7 of Figure 1.
Figure 8:
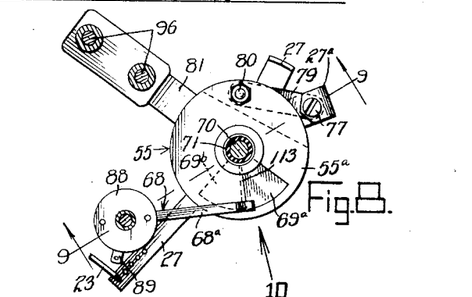
Figure 8 is a section of the switch mechanism taken on line 8—8 of Figure 7.

The complete control instrument is illustrated in Figure 1 with the cover removed so that the arrangement of the parts may be more readily disclosed. To aid in understanding of the operation of the instrument, it is preferable that this figure be inspected in conjunction with Figure 2 which schematically illustrates the same parts arranged in more open fashion than they are arranged in the completed commercial instrument. Figure 4 shows how the various elements of Figure 2 have been combined, maintaining the same interconnections, to form the completed instrument illustrated in Figure 1.

Before considering the specific construction of the instrument in detail it might be advantageous to briefly outline the operation of the device whereby a better understanding of the functioning of the individual components thereof may be had and some insight as to the reasons for their particular conformation and arrangement shown in this embodiment of the invention.

Essentially the instrument consists of two temperature measuring systems 1 and 2 connected through a linkage mechanism 28 to a control mechanism 25. The linkage mechanism 28 comprises a system of levers and links so inter-related that movement of the temperature indicating elements 9 and 10 of the temperature measuring system 1 and 2 produces a resultant movement which is a differential of the movements of 9 and 10. Thus no resultant motion occurs if the desired relationship between these two temperatures is maintained. The inter-relation of these parts of the linkage mechanism may be more readily understood by reference to Figure 2 in which the effective relationship is shown schematically. Indicator arm 9, which moves in accordance with variations in the outdoor temperature measured by bulb 5, is connected by link 13 to the outer extremity of a lever arm 15 which arm rotates about a fixed pivot point 21. At some intermediate point 31 on arm 15 another lever arm 16 is rotatably mounted. In the embodiment herein described the length of lever arm 16 is approximately equal to twice the distance between pivot 31 and pivot 21. The motion of indicator arm 10, which varies in accordance with the temperature of the measuring bulb 6 mounted in the steam-pipe, is transmitted by wire link 14 to the outer extremity of lever arm 16. The motion of the inner end, that adjacent to pivot 21, of lever 16 is transmitted through link 23 to the control switching mechanism, generally indicated at 25.

Figure 2:
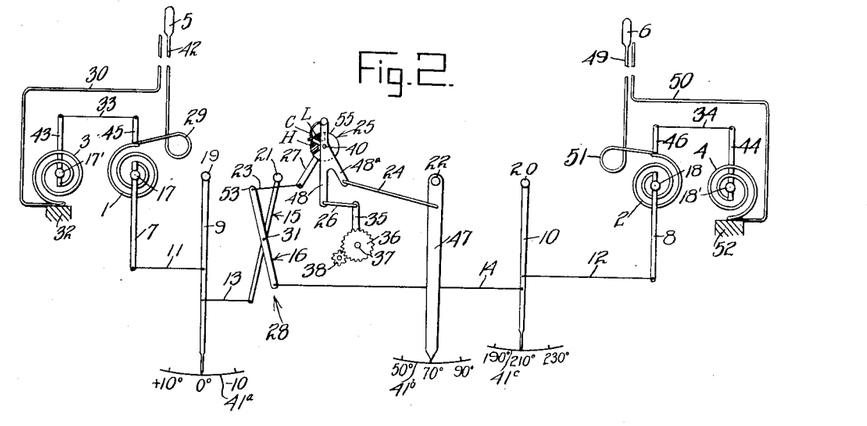
Figure 2 is a schematic diagram illustrating the inter-connection of the various parts.

The switching mechanism 25, which will be hereinafter described in greater detail, is comprised essentially of two contact segments 69a or H and 69b or L mounted on disc or discs 55 and adapted to be rotated about a fixed pivot 40 on axis Y—Y by movement of the attached arm 27. Contact is made with these segments by a brush or brushes 68 or C in such a manner that movement of arm 27 to the right causes a contact to be made between C and L, whereas movement to the left forms a contact between C and H. The position of brush C with respect to the pivot 40 is determined by a manually operable positioning mechanism. Brush C is attached to lever arm 48 which is rotatably mounted about the fixed axis Y—Y. One end of arm 48 is connected by wire length 26 to arm 35 attached to the gear 36 rotatably mounted for meshing with gear 38 suitably secured with respect to the manually operable knob 39. Arm 48 is also connected to index pointer 47, which is pivotally mounted at point 22, by link 24. By the use of this positioning mechanism, adjustment of the index knob 39 causes brush C to assume a desired position with respect to pivot 40, and this position is indicated on scale 41b by the pointer 47. With this arrangement, it is possible to adjust the control point of the switch mechanism 25 as desired.

In order that a better understanding of the functions and operations of this controller may be had, reference may be made to Figures 3a through 3f, 6a, and 6b. It is customary in the design of the heating system of a building to use some fundamental relationship of the three inter-dependent temperatures. The relationship commonly employed by engineers in such design is one whereby the heating system is capable of supplying sufficient heat to maintain an indoor temperature of 70 degrees F. with a radiator steam temperature of 210 degrees F. when the outdoor temperature is 0 degrees F. A graph, illustrating such relationship of the steam temperature to the outside temperature with a constant indoor temperature, is shown in curve I of Figure 6a. This is an empirical curve for a specific heating system, which has been determined by experiment. It shows that the above-mentioned relationship between these temperatures may be represented by what may be characterized a first degree equation of the form $$y = mx \text{ plus } b \text{ or } \frac{y}{mx \text{ plus } b} = 1$$

which is the equation of a straight line and in which $m$ equals the slope of the line and $b$ equals the intercept on the $y$ axis when the line passes through zero on the $x$ axis. Thus it might be said that the controller, in maintaining such a relationship between the temperatures, maintains a constant ratio therebetween.

It is an object of the controller, herein described as an embodiment of the invention, to maintain the outside and steam temperatures in relationship which may be expressed by such an equation by controlling the steam temperature to maintain the desired control relationship. The operation of the device to accomplish this result may be more readily understood by referring to Figures 3a through 3f.

Figure 3A:
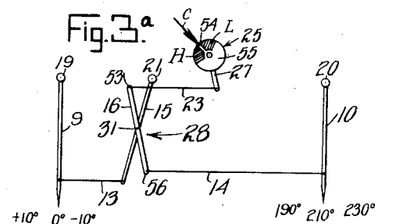
Figures 3a, 3b, 3c, 3d, 3e and 3f show a series of schematic diagrams illustrating the relative movements of the linkage mechanism for various conditions of operation.

The series of schematic diagrams shown in Figures 3a through 3f show the action of the linkage mechanism for various conditions of operation. Figure 3a shows the position of the levers for a balanced condition when the two varying temperatures whose values are shown by the respective positions of pointers 9 and 10 are in the proper relationship to each other. Brush C is placed in the proper position for maintaining a room temperature of 70 degrees, while pointer 9 indicates an outdoor temperature of 0 degrees, and pointer 10 indicates a steam temperature of 210 degrees; and thus correspond to the proper desired relationship, as shown in curve I of Figure 6a.

Figure 3B:
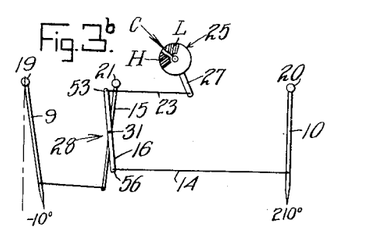

Figures 3b illustrates the effect of a drop in the outdoor temperature to −10 degrees without a corresponding rise in the steam temperature. This causes arm 9, arm 15, and therefore the movable pivot 31 to move toward the right of the drawing. As the lower extremity 56 of arm 16 remains at the same point that it was in drawing 3a because there was no change in the steam temperature, this results in a corresponding movement of the other end 53 of arm 16 toward the right and causes the switching mechanism 25 to be rotated through link 23 and arm 27 in a counter-clockwise direction, and thus makes a contact between brush C and segment L, which contact may be caused to operate a control mechanism to effect an increase in the steam temperature.

Figure 3C:
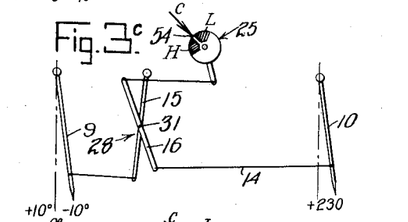

When the steam temperature has increased to the proper value, the linkage mechanism will assume the position shown in Figure 3c, wherein pointer 9 and arm 15 are in the same position as in 3b. Pointer 10, however, has moved to the right until it indicates 230 degrees, at which value the desired relationship with respect to the outside temperature has been restored. Fulcrum 31 of arm 16 remaining in a fixed position, movement of the lower end 56 of arm 16 to the right causes the upper end 53 to move a corresponding distance to the left, and thus rotate switch mechanism 25 in a clockwise direction until, when pointer 10 indicates 230 degrees, brush C has assumed a position on the inter-space 54 between the two segments H and L, the contact between L and C is interrupted, and balance is restored.

Figure 3D:
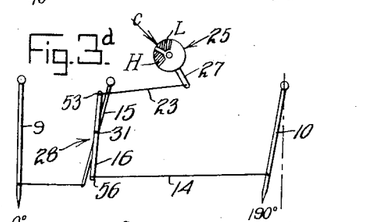

Assuming again the condition of Figure 3a, as the steam temperature drops, instead of the outdoor temperature, the linkage mechanism will assume the position shown in Figure 3d. Under this condition, pointer 9, arm 15 and fulcrum 31 will remain stationary; but arm 10, moving to the left, will, through link 14, pull the lower extremity 56 of arm 16 to the left also, and cause the other end 53 of arm 16 to move a corresponding distance to the right. This motion will be transmitted through link 23 and arm 27 to the switching mechanism 25, cause it to rotate in a counter-clockwise direction in the same manner as shown in Figure 3b, likewise causing a contact between brush C and segment L and thus initiating a control operation tending to cause an increase in steam temperature to restore the balance condition illustrated in Figure 3a.

Figure 3E:
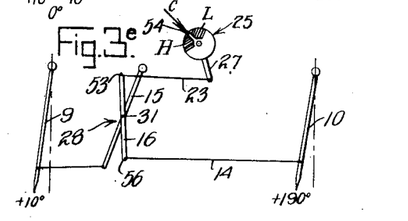

If the outdoor temperature, under the condition of Figure 3d, rises a corresponding amount, the linkage mechanism will assume the position shown in Figure 3e. If the outdoor temperature rises to plus 10 degrees a balanced condition at the desired relationship is reached and no control operation is initiated because brush C rests on the inter-space 54 between the two segments H and L.

Figure 3F:
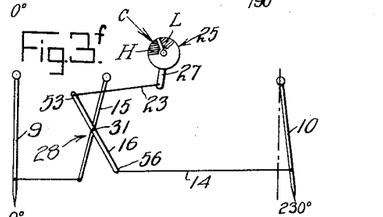

Figure 3f illustrates a change from the conditions shown in Figure 3a, wherein the steam temperature increases. Pointer 9, arm 15 and fulcrum 31 remain stationary, and movement of pointer 10 to the right causes contact to be made between brush C and segment H.

The three conditions of balance illustrated in Figures 3a, 3c and 3e when the relationship between the steam temperature and the outdoor temperature is at the desired predetermined constant value, are shown at the points a, c and e on curve I of Figure 6a.

If, due to a change in the heat balance such as, for example, an increase in the losses due to aging of the building etc., it is necessary to change the amount of heat supplied to the system per degree change in outside temperature, it will be necessary to change the control relationship maintained between the two temperatures. Such a change may be accomplished by changing the transmission ratio of the lever system, i. e., their mechanical advantage, which is equivalent to varying the slope of the characteristic curve or to changing the value of "$m$" in the above-mentioned equation. Curves P, Q, R, S and T in Figure 6b illustrate the effect of such changes on the control relationship. The manner of changing the control relationship by adjusting the linkage mechanism of the control device will be hereinafter described in greater detail.

On the other hand, if it is necessary to change the quantity of heat supplied to the system by a constant amount for all values of outside temperature as, for example, in order to increase or decrease the desired indoor temperature to compensate for a change in the radiation from the building due to wind conditions, etc., then the slope of the curve of the control relationship, i. e. the value "$m$", is maintained constant; but the entire curve is shifted or moved with respect to its axes, which is equivalent to changing the value of "$b$" in the above-mentioned equation. This adjustment of the control relationship may be accomplished by shifting the position of the brush C with respect to the pivot 40, which movement adjusts the control point of the switching mechanism 25. As this latter adjustment is most frequently made to change the value of the desired indoor temperature, the scale 41b associated with the pointer 47 which is positioned by the setting of knob 39, is conveniently calibrated in room temperatures. Curves I, II and III in Figure 6a show the predetermined control relationship at various positions of the knob 39 corresponding to the indication on the dial 41b of 65 degrees F., 57 degrees F. and 85 degrees F., respectively. It is evident, however, that the value of the indoor temperature indicated by pointer 47 on scale 41b is only an approximation of the indoor temperature being maintained by operation of the control device.

Returning now to the specific instrument shown in Figure 1, for purposes of description the apparatus may be considered as comprising three sections. The first section comprises the temperature-measuring and indicating elements 1 and 2; the second section comprises a linkage mechanism, generally indicated at 28, whereby the movement of the temperature measuring and indicating devices of the first portion are so combined that if the two values of temperature being measured vary in such a manner that their relationship to each other is maintained as desired, no resultant motion is transmitted to the third portion of the apparatus, which comprises a switching mechanism 25. If the two temperatures do not vary so as to maintain the desired relationship, then a resultant movement is transmitted from the linkage mechanism 28 to the switching mechanism 25 whereby a control operation is initiated in a direction tending to restore the desired relationship between the two temperatures.

The temperature-measuring systems as shown are of the helical tube liquid-filled type, made of flattened tubing wound in the form of a helix such as 1, connected by a tubing 42 to a temperature-measuring bulb 5 which is exposed to the temperatures to be measured. This system, comprising the bulb 5, tubing 42 and helix 1, is completely filled with a liquid having a desired coefficient of expansion. When the bulb 5 is subject to an increase in temperature, the liquid therein expands and increases the pressure in the system. This increase in pressure is transmitted through the tubing 42 to helix 1 and causes the helix 1 to expand or unwind in the well-known manner. This tendency to unwind causes an angular displacement of one end of the helix with respect to the other, which displacement is proportional to the change in temperature of the bulb 5 if the connecting tubing 42 and the helix 1 remain at a constant temperature. If the angular displacement thus developed is calibrated with respect to a fixed point, the device may be made to measure the temperature of the bulb.

To correct for change in the ambient temperature around the connection tubing 42 and in the helix 1, a compensating mechanism is provided comprising another helical tube 3 connected through a tubing 30 which runs parallel with tube 42 to the temperature bulb 5 where it terminates, instead of being connected to a measuring bulb similar to bulb 5. This helical tube 3 is similar to tube 1 but is so constructed as to give an angular displacement in the reverse direction to that obtained in tube 1 due to a change in temperature. The angular displacement of helix 3 is proportional to any change in temperature in the instrument case itself, i. e., of helix 3, or in the connection tubing 30; and the magnitude of such displacement is equal and opposite to that caused in helix 1 by a similar change in temperature of the helix 1 and the connection tubing 42, and is completely independent of any change in the temperature of the measuring bulb 5. Helix 3 is mounted with its axis passing through fixed pivot point 17'. One end of the helix is fixed with respect to a fixed support 32 and the other end is secured to an arm 43 pivotally mounted on the support 32 at the pivot point 17'. Expansion of the helix, due to changes in temperature, rotates arm 43 which is connected by a wire link 33 to a similar arm 45 pivotally mounted on another support at 17 and secured to the inner end of the helical spiral 1. Tubing 42 is connected to helix 1 by the flexible tubing 29 wound spirally about helix 1 and thus permits its rotation about pivot 17. The other end of helix 1 is secured to arm 7 also pivotally mounted on the support. The arm 7 is connected by a wire link 11 to arm 57a (Figure 11) pivotally mounted about axis x—x and suitably connected with indicating pointer 9.

With this arrangement, it is evident that the angular movement of arm 43 about fixed point 17' is proportional to the temperature in the instrument casing which is the temperature of all the helices and to the temperature of the tubing going to the bulb (not shown). The angular movement between arm 45 and arm 7 of helix 1 is proportional to the temperature of the instrument casing 100 and the tubing 42 leading to the bulb 5, as well as to the temperature of the measuring bulb 5 itself. As the expansion of helix 3 is in opposite direction to that of helix 1, it tends to rotate helix 1 by an amount equal and opposite to the rotation caused in helix 1 due to change of the temperature of the instrument casing and of the connecting tubing. This differential arrangement of the two helices eliminates movement of the indicating pointer 9, due to changes in the ambient temperature surrounding the connecting tubings 30 and 42 and the helices 1 and 3, and causes the amount of angular rotation of arm 7 about point 17 to be directly proportional to the temperature in the measuring bulb 5. This temperature is indicated by pointer 9 on scale 41a.

In the present embodiment, bulb 5 is exposed to outdoor temperature.

A duplicate arrangement is provided for measuring the temperature of the steam in the heating system. This mechanism comprises temperature-measuring bulb 6, mounted in a steam pipe and connected by tubing 49 to the helical tube 2, and tubing 50 which runs parallel to tubing 49 and is connected to helical tube 4. The tubes 2 and 4 are mounted, as are tubes 1 and 3, respectively. Arm 44, secured to tube 4, is connected by link 34 to arm 46 connected to an end of helix 2. Arm 8, secured with respect to the other end of helix 2, is connected by link 12 to an arm 60a connected with pointer 10 which indicates the steam temperature on scale 41c.

The linkage mechanism connecting the measuring mechanism with the control mechanism will now be considered.

To compact the mechanism and to obtain other results, as shown in Figures 1, 4, 7 and 11, the pointers 9, 10 and 47 and lever 15 are so mounted that they pivot about points arranged on a single horizontal axis x—x—x. This also facilitates placing the scales 41a, 41b and 41c on a common dial 41. This is accomplished by mounting their pivots on spaced vertical supporting plates or fingers 61a, 61b, 61c, and 61d, supported on horizontal posts 62, suitably secured to and extending forwardly from the rear wall of the casing 100.

The pointer 9, which indicates the temperature of the left-hand (outside) temperature-responsive system, is mounted on a U-shaped arm 57 suitably supported between supporting plates 61a and 61d. Further, the pointer 9 is so mounted that its effective pivot point is on the common pivot axis x—x and the axis about which the arm 57 rotates. The connection between the pointer 9 and the arm 57 is preferably made adjustable so that the position of the pointer may be calibrated to the dial 41a and the temperature-responsive bulb 5. This is accomplished by rotatably mounting a screw 65 in a block 63 extending from the upper end of the pointer 9. The screw 65 is then threaded into a block 66 which is mounted on the U-shaped arm 57. The inner end of the arm 57 has an extension 57a to which the helix 1 is connected by the wire link 11.

Figure 11:
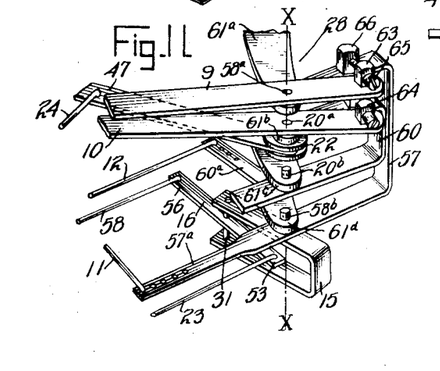
Figure 11 is a perspective of a pivotal mounting of a portion of a lever mechanism taken in the direction of arrow 11 in Figure 1.

The lever referred to as 15 in the diagrammatic sketch in Figure 2 is shown in Figures 4 and 11 as a U-shaped member 15, suitably secured to the U-shaped arm 57 in such a manner as to rotate about the axis x—x as 57 is rotated thereabout. The floating lever 16 of the diagram on Figure 2 is mounted on a pivot 31 extending between the ends of the U-shaped member 15. The length of the lever 16 and the position of the pivot 31 with respect to the lever 15 is preferably so chosen that the end 53 of the lever 16 may be approximately aligned with the axis x—x, this arrangement being desirable because of the increased accuracy which it gives to the instrument.

The end 56 of lever 16 is connected to the right-hand (steam) temperature-responsive system by means of a wire link 58 which is connected at its other end to an angle-shaped bracket arm 59 extending from the helix 2. Thus, the end 53 of lever 16, which may be aligned with the axis x—x, is positioned in accordance with the value of the right and left-hand temperature-responsive systems, and this end of the lever is connected by wire link 23 to an arm 27 extending from the switch mechanism 25.

The pointer 10 which indicates the temperature of the right-hand (steam) temperature-responsive system, referring to Figures 4 and 11, is mounted on a U-shaped member 60 pivotally mounted on the supporting fingers 61b and 61c. The pointer is so mounted on the arm 60 as to pivot about the axis x—x and is adjustably connected with the U-shaped member 60 by means of a screw and nut arrangement such as is used to connect the pointer 9 with its supporting member 57. Extending from the U-shaped member 60 is an arm 60a so arranged as to overlie approximately the floating lever 16, and this arm 60a is connected by wire link 12 to the arm 8 extending from the helix 2. Thus, movement of the helix 2 is transmitted simultaneously to the pointer 10 and to the floating lever 16.

The various arms and levers connected together by the wire links are preferably provided with numerous holes whereby the effective lengths of the levers may be varied by shifting of the wire links from one hole to another. In this way the mechanical advantage between the levers may be adjusted to compensate for the individual characteristics of the helices and to adjust the control characteristic and sensitivity of the instrument.

Preferably, however, the principal field adjustment for determining the slope of the control relationship curve, as mentioned above, is made in the connection between bracket arm 59 of helix 2 and its link 58. The arm 59 is provided with a series of fifteen holes to give a wide range of adjustment. Figure 6b illustrates the effect of variation of the position of link 58 with respect to arm 59. Curves P, Q, R, S and T show the different relationships obtained by positioning links 58 in holes 1, 4, 8, 12 and 15, respectively, (Figure 4), when the index pointer 26 and switch 25 is set to maintain a room temperature of 80 degrees corresponding to curve III of Figure 6a.

This adjustment enables the control relationship to be varied as a building ages, for example, and the heat losses therefrom increase.

The pointer 47, shown in Figure 2, is also mounted to pivot about the axis x—x, as shown in Figure 11, it is pivoted on the plate 61b and, as shown in Figure 1, is connected by a wire link 24 to an arm 48a, which is positioned about the pivot 40 by means of the hand-operated knob 39. Thus the setting of switch 25 is always indicated by the pointer 47.

The switching mechanism is preferably operable solely by the temperature-responsive elements. Since these elements, when sensitive, have only a small amount of available power it is desirable that the linkage mechanism 28 and switching mechanism 25 be responsive to small forces so as not to interfere with the accuracy of the instrument. This result is accomplished in the linkage mechanism 28 by making the lever arms as light as possible and by suspending them in loose bearings, etc.

The resultant motion of this mechanism, i. e., that transmitted by link 23, operates control mechanism which also requires little force. In the present embodiment it comprises the switching mechanism 25. This mechanism comprises insulating discs 55 rotatably mounted (Figures 7, 9 and 10) on a shaft 70 suitably held by arms 81, 84 and 85 extending from the forwardly projecting supporting post 82 mounted on the wall 100 of the case. The discs pivot as a unit about the axis y—y and coact with brushes 68 mounted on a stud shaft 91 extending inwardly from arm 48 which is pivotally mounted about axis y—y.

Figure 9:
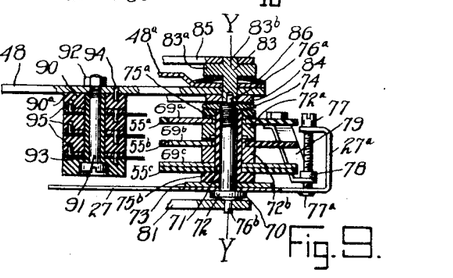
Figure 9 is a section of the switch mechanism taken on line 9—9 of Figure 8.
Figure 10:
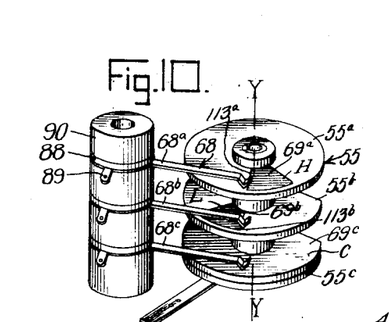
Figure 10 is a perspective view of a portion of the switch mechanism taken in the direction of arrow 10 in Figure 8.

Disc 55a of the disc unit is formed from insulation material and carries a metal segment 69a countersunk therein so that its outer surface is flush with the surface of the disc. Disc 55b is similar to disc 55a, having a metal segment 69b. The angular position of discs 55a and 55b with respect to each other may be adjusted, as will be hereinafter described, in order to obtain the desired control. As shown in Figures 9 and 10, the left-hand edge of segment 69a is preferably slightly to the right of the right-hand edge of segment 69b, thereby leaving a sector 113 with respect to axis y—y, over which neither brush 68a nor 68b contacts the metal segments. The disc 55c is similar to 55a and 55b except that it has no metal segment. Instead, it carries a disc 69c so that brush 68c makes electrical contact therewith for all degrees of rotation of the discs about axis y—y.

These discs are mounted on the metal pivot shaft 70, but separated therefrom by insulating sleeve 71. The discs are separated by metal spacing collars 72a and 72b in such a manner that an electrical contact is formed between segments 69a and 69b and metal disc 69c. Also mounted with the shaft is the arm 27 which is connected by link 23 to the lever 16. Over the shaft are also placed various washers and the whole unit is tightly secured together by a nut 74 threaded on the outer threaded portion of the shaft. The inner end of the shaft is expanded at 72. This portion and the nut 74 are provided with conical surfaces to reduce the areas of the surfaces contacting. The insulating washers 75a and 75b are provided to prevent an electrical contact between the connected segments associated with the discs and any other metal portions of the pivotal mounting. Pivot shaft 70 is provided with reduced ends 76a and 76b for supporting the disc assembly.

Disc 55a and its segment 69a may be angularly adjusted with respect to arm 27 and so with respect to disc 55b and its segment 69b. This is accomplished as follows: The portion 27a of arm 27 on the opposite side of axis y—y from link 23 is formed in the shape of a U. An adjustment screw 77 is suitably rotatably mounted between the two sides of the U-shaped portion 27a and held against axial movement. The screw is threaded through a block 78 which is moved along the screw by rotation of the latter. To the block is attached a connecting metal strip 79 the other end of which is secured to disc 55a by rivet 80. Thus, rotation of screw 77 varies the angular relation between disc 55a and disc 55b, which is held stationary with respect to arm 27.

The forward end of shaft 70 is supported by a rotatable bearing member 83 suitably mounted between the supporting arm 84 and an arm 85 parallel to arm 84 and secured to post 82 by screws 96. The inner end of bearing 83 extends through arm 84 and receives a reduced portion 76a of shaft 70, the bearing 83 stopping short of the main portion of shaft 70 and nut 74 to allow sufficient axial play of shaft 70.

Mounted on member 83, and between arm 84 and expanded bearing portion 83a of member 83, is an arm 48 carrying the brushes and an arm 48a, connected by link 24 to pointer 47. A spring washer 86 holds the arm 48 against fixed arm 84 to provide friction therebetween. The tension on the spring is adjusted by adjusting the spacing between arms 84 and 85 by means of a screw 87 extending through arm 85 and threaded into arm 84.

With this arrangement, the small friction between the brush and disc assembly does not cause the brush assembly to rotate when the disc assembly is rotated. But only small force is necessary to rotate the disc assembly.

Arm 48 supports the brush assembly, and is connected by link 26 inserted in a hole at its outer end, see Figure 1, to arm 35 of the positioning mechanism. Arm 48a is secured with respect to arm 48 and the motion of arm 48 is transmitted through link 24 to the index pointer 47.

The brush assembly, Figures 9 and 10, comprises the brushes 68a, 68b and 68c extending from metal washers 88, also provided with soldering connection lugs 89. The metal washers are separated by the collars 90 of insulating material, and held together by stud 91 passing through the members and the arm 48 and held also by a nut 92. An insulating sleeve 93 prevents electrical contact between the metal washers 88 and the stud 91. The contact strips 68a, 68b and 68c are made of spring metal with V-shaped bends at their outer ends to form suitable contacting surfaces. They are kept in alignment by the pins 95 extending through the washers 88 and into, but not through, the insulated collars 90. The brush assembly is so mounted with respect to arm 48 that the contacting portions of the brushes travel on the discs at a point just inside of the outer edge of the metal segments 69a and 69b.

A switch mechanism of the type above described thus provides a condition-controlling device which will function properly with only the small motivating force exerted by the condition-measuring devices themselves. Figure 5 illustrates schematically one type of control circuit which might be used in connection with the switching mechanism 25 to control steam temperature to maintain the desired relationship between the outdoor and steam temperatures.

The connection lugs 89 of brushes 68a, 68b and 68c are respectively connected by leads 97 through fuse block 98, leads 99, binding posts 101 on the casing 100 (Figure 1) and wire cable 102 to connection posts 103 of the control circuit. This circuit comprises a control relay 104, a solenoid-actuated two-position control valve 105, and a power supply 106. Relay 104 comprises core 107, two armatures 108 and 109, and three sets of contacts 110, 111 and 112, suitably arranged with respect to the armatures. All of these contacts might be arranged on a single armature, if desired. Contacts 110 and 111 control valve 105. When the core 107 is de-energized contact 110 is closed, causing valve 105 to close, and when energized contact 111 is closed, causing valve 105 to open. Contact 112 acts as a "keeper" contact, maintaining the relay 104 in an energized state whenever core 107 is momentarily energized, until it is de-energized by short-circuiting the core 107 which opens simultaneously contact 112. Resistor 119 is provided to prevent undue current flow during such a short-circuit period. The supply voltage 106 may be any available source of electrical power.

The operation of this control circuit is as follows: When the relationship varies from the desired value in one direction, contact is made between L and C, momentarily energizing core 107, closing "keeper" contact 112 which maintains the relay in an energized state and simultaneously closing contact 111 which causes the valve 105 to open. This condition is maintained until the relationship varies in the other direction from the desired value and contact H—C is formed. This short-circuits core 107 and thereby de-energizes it, releasing contacts 111 and 112 and closing contact 110 which causes valve 105 to close. Whenever the brushes are on the intermediate sector 113 and neither contacts H—C or L—C are closed, no change of condition occurs until the brushes move through this intermediate sector to one side or the other.

As the edges of this sector 113 represent, for any value of outside temperature, two slightly different steam temperatures, it is apparent that when the steam temperature is increasing the steam valve 105 is closed at a temperature which is slightly higher, i. e. a temperature corresponding to the position of the left-hand edge 113a of segment 69a, than the temperature at which the valve is opened when the steam temperature is decreasing, i. e. that temperature corresponding to the position of the right-hand edge 113b of segment 69b.

Because the control valve 105, which is located in the steam system, is of the off-on type the steam temperature will cycle constantly as the valve 105 is alternately opened and closed and the amount of this cycling will be partially dependent upon the lag characteristics of the system. The above-mentioned difference in the control steam temperatures tends to decrease the magnitude of this cycling in the control caused by lag in the condition. In various installations having different characteristics, it is often desirable to change this control differential and the adjustment mechanism, actuated by screw 77 described above, is provided to accomplish this adjustment.

While I have shown and described a particular construction embodying this invention as applied to a controller for maintaining a desired relationship between the outdoor temperature and the temperature of the steam supplied to the heating system of a building, it is to be understood that the same is for the purpose of illustration only, and that I am not limited to the detailed features thereof, as it is understood that the construction may be variously modified and altered without in any manner departing from the spirit and scope of the invention, as set forth in the appended claims.

I claim:

1. In a control apparatus, in combination, a first condition-sensitive means movable in response to a first variable condition, a second condition-sensitive means movable in response to a second variable condition, a differential lever mechanism, a first linkage mechanism transmitting the motion of said first means to said differential mechanism, a second linkage mechanism transmitting the motion of said second means to said differential mechanism, said differential mechanism combining the motions which are transmitted to it into a resultant motion, a control means proportionally responsive to said resultant motion, a condition-influencing agent controlled by said control means, said agent affecting said first condition in a manner to maintain a desired relationship between said first and second conditions, said second condition influencing a third variable condition, a fourth means indicating the value of said third condition that is approximately maintained by maintaining said relationship, said control means comprising a rotary electrical switching assembly having a plurality of discs of insulating material mounted on a shaft which is rotated by said resultant motion, a contacting segment associated with each of said discs, a plurality of brushes adjustably mounted so that one of them may contact each of said segments, said brushes being connected to an electrical circuit controlling said condition-influencing agent, the position of said brushes in part determining said desired relationship, and a fifth means for adjusting said indicating means and the position of said brushes to change said relationship and so to change the said value of said third condition.

2. In control apparatus of the type wherein a first condition-sensitive means, movable in response to a first variable condition, and a second condition-sensitive means, movable in response to a second variable condition, move a differential linkage mechanism which exerts a control on one of said conditions; a differential linkage mechanism including, in combination, a lever having a stationary pivotal axis, means for moving said lever angularly about its pivotal axis in accordance with movement of a first condition-sensitive means, a floating lever pivotally mounted about an axis on said first lever laterally displaced from said stationary axis, means attached to one end of said floating lever for moving said floating lever angularly about its pivotal axis in accordance with the movement of a second condition-sensitive means, a point at the other end of said floating lever being adapted to swing through said stationary axis, and means connected to said floating lever at said point adapted to exert control on one of said conditions.

3. In control apparatus of the type wherein a first condition-sensitive means, movable in response to a first variable condition, and a second condition-sensitive means, movable in response to a second variable condition, move a differential linkage mechanism which exerts a control on one of said conditions, to maintain a predetermined relationship between said conditions; a differential linkage mechanism comprising, in combination, a lever having a stationary pivotal axis, means for moving said lever angularly about its pivotal axis in accordance with movement of a first condition-sensitive means in a predetermined ratio, a floating lever pivotally mounted about an axis on said first lever laterally displaced from said stationary axis, means attached to one end of said floating lever for moving said floating lever angularly about its pivotal axis in accordance with the movement of a second condition-sensitive means in a predetermined ratio, a point at the other end of said floating lever being adapted to swing through said stationary axis, and means connected to said floating lever at said point adapted to exert control on one of said conditions.

4. In control apparatus of the type wherein a first condition-sensitive means, movable in response to a first variable condition, and a second condition-sensitive means, movable in response to a second variable condition, move a differential linkage mechanism which exerts a control on one of said conditions; a differential linkage mechanism comprising, in combination, a lever having a stationary pivotal axis, wire linkage means connected to said lever for moving said lever angularly about its pivotal axis in accordance with movement of a first condition-sensitive means, a floating lever pivotally mounted at its center of gravity about an axis on said first lever laterally displaced from said stationary axis, wire linkage means attached to one end of said floating lever for moving said floating lever angularly about its pivotal axis in accordance with the movement of a second condition-sensitive means, a point at the other end of said floating lever being adapted to swing through said stationary axis, and wire linkage means connected to said floating lever at said point and to means adapted to exert control on one of said conditions.

5. In a control apparatus of the type wherein the separate movements of a plurality of condition-sensitive means independently responsive to independently variable conditions are interrelated by a linkage mechanism to produce a resultant motion which operates a rotary electrical switch connected to an electrical circuit which exerts ontrol on one of said conditions, and wherein the power producing said resultant motion is derived entirely from the movement of said condition-sensitive means; a rotary electrical switching assembly including, in combination, a plurality of discs of insulating material mounted on a shaft which is rotated in accordance with a resultant controlling motion, a flat contacting segment flush-mounted on the face of each of said discs, a plurality of brushes mounted so that one of them may contact each of said segments, and said brushes being connected to electrical control means for regulating the value of one of said conditions.

6. In a control apparatus of the type wherein the separate movements of a plurality of condition-sensitive means independently responsive to independently variable conditions are interrelated by a linkage mechanism to produce a resultant motion which operates a rotary electrical switch connected to an electrical circuit which exerts control on one of said conditions, and wherein the power producing said resultant motion is derived entirely from the movement of said condition-sensitive means; a rotary electrical switching assembly including, in combination, a plurality of discs of insulating material mounted on a shaft which is rotated in accordance with a resultant controlling motion, a flat contacting segment flush-mounted on the face of each of said discs, a plurality of brushes mounted so that one of them may contact each of said segments, said segments being interconnected and the relative position of said segments and said brushes being such that in varying angular positions of said brushes certain of said brushes are interconnected through said segments, and said brushes being connected to electrical control means for regulating the value of one of said conditions.

7. In a control apparatus of the type wherein the separate movements of a plurality of condition-sensitive means independently responsive to independently variable conditions are interrelated by a linkage mechanism to produce a resultant motion which operates a rotary electrical switch connected to an electrical circuit which exerts control on one of said conditions, and wherein the power producing said resultant motion is derived entirely from the movement of said condition-sensitive means; a rotary electrical switching assembly including, in combination, a plurality of discs of insulating material mounted on a shaft which is rotated in accordance with a resultant controlling motion, a flat contacting segment flush-mounted on the face of each of said discs, a plurality of brushes adjustably mounted so that one of them may contact each of said segments, said brushes being connected to electrical control means for regulating the value of one of said conditions, and the position of said brushes determining the point in said resultant motion at which said regulation is effected by said switch.

CARLTON L. LOTHROP.